United States Patent [19]

Mills et al.

[11] Patent Number: 5,340,884

[45] Date of Patent: Aug. 23, 1994

[54] POLYAMIDE CONCENTRATE USEFUL FOR PRODUCING BLENDS HAVING IMPROVED FLAVOR RETAINING PROPERTY AND CLARITY

[75] Inventors: David E. Mills, Kingsport; Steven L. Stafford, Gray, both of Tenn.

[73] Assignee: Eastman Kodak Company, Kingsport, Tenn.

[21] Appl. No.: 119,302

[22] Filed: Sep. 13, 1993

Related U.S. Application Data

[63] Continuation-in-part of Ser. No. 862,027, Apr. 2, 1992, Pat. No. 5,258,233.

[51] Int. Cl.$^5$ .................. C08F 283/04; C08L 77/00; B32B 27/34
[52] U.S. Cl. ..................... 125/420; 525/425; 524/439; 524/443; 524/474; 528/502; 264/523; 428/480
[58] Field of Search .............. 525/425, 420; 524/439, 524/443, 474; 528/502; 264/523; 428/480

[56] References Cited

U.S. PATENT DOCUMENTS 4,052,481 10/1977 Asahara et al. .
4,193,803 3/1980 Sandhu et al. .
4,261,473 4/1981 Yamada et al. .
4,398,017 8/1983 Go .
4,501,781 2/1985 Kushida et al. .
4,837,115 6/1989 Igarashi et al. .

FOREIGN PATENT DOCUMENTS 0092979 11/1983 European Pat. Off. .
0212339 3/1987 European Pat. Off. .

Primary Examiner—John Kight, III
Assistant Examiner—Duc Truong
Attorney, Agent, or Firm—John D. Thallemer

[57] ABSTRACT

This invention relates to a polyester/polyamide blend having an excellent gas barrier property and an improved flavor retaining property, and clarity. More particularly, the present invention relates to a polyethylene terephthalate/low molecular weight polyamide blend having an excellent gas barrier property, in which by reducing the concentration of acetaldehyde contained in the polyester, the storage property of a food or the like and the flavor-retaining property and fragrance retaining property are highly improved without producing haze.

17 Claims, No Drawings

POLYAMIDE CONCENTRATE USEFUL FOR PRODUCING BLENDS HAVING IMPROVED FLAVOR RETAINING PROPERTY AND CLARITY

This application is a continuation-in-part of application Ser. No. 07/862,027, filed Apr. 2, 1992.

FIELD OF THE INVENTION

This invention relates to a polyester/polyamide blend having an excellent gas barrier property and an improved flavor retaining property, and clarity. More particularly, the present invention relates to a polyethylene terephthalate/low molecular weight polyamide blend having an excellent gas barrier property, in which by reducing the concentration of acetaldehyde contained in the polyester, the storage property of a food or the like and the flavor-retaining property and fragrance retaining property are highly improved without producing haze.

BACKGROUND OF THE INVENTION

Polyethylene terephthalate (PET) is widely used for the production of light weight plastic articles since PET is excellent in mechanical properties such as formability and creep resistance and can be biaxially molecularly oriented- However, during molding or extrusion processes, acetaldehyde is formed by thermal decomposition of the polyester and when the polyester is formed into an article, the acetaldehyde in the article walls migrates into the contents of the article. Small amounts of acetaldehyde adversely affect the flavor retaining property of foods and beverages, and the fragrance retaining property of foods, beverages, cosmetics, and other package contents. For these reasons, it is desirable to minimize the migration of acetaldehyde into package contents.

Thermoplastic polyesters excellent in gas barrier properties have been proposed. For example, U.S. Pat. No. 4,398,017 discloses a copolyester containing terephthalic acid and isophthalic acid as the acid component, and ethylene glycol and bis(2-hydroxyethoxy)benzene as the diol component. However, when such gas barrier polyester is used as a constituent material of a container, permeation of gases such as oxygen and carbon dioxide are controlled, but acetaldehyde migration into the food or beverage is not controlled, and thus, the flavor and fragrance of the content is effected.

The use of polyamides to increase the gas barrier properties in polyethylene terephthalate resins is disclosed in U.S. Pat. Nos. 4,837,115, 4,052,481 and 4,501,781.

U.S. Pat. No. 4,837,115 discloses a thermoplastic composition containing polyethylene terephthalate and high molecular weight polyamides which act to reduce the residual acetaldehyde contained in the polyester. U.S. Pat. No. 4,837,115 states that the molecular weight of the polyamide is not critical so far as the polyamide has a film-forming property. Such polyamides, therefore, must have high enough molecular weights to form a film. It is well known in the art that polyamides having molecular weights of at least 12,000 are necessary to form a film.

U.S. Pat. No. 4,052,481, discloses a resin composition containing an aromatic copolyester, a polyamide and a polyalkylene phenylene ester or a polyalkylene phenylene ester ether. The aromatic copolyester contains terephthalic acid, isophthalic acid and a bisphenol.

U.S. Pat. No. 4,501,781, European equivalents, 212339 and 0092979, disclose a mixture containing 70 to 95 weight percent of a polyethylene terephthalate resin and 5 to 30 weight percent of a xylylene group-containing polyamide resin. U.S. Pat. No. 4,501,781 does not mention acetaldehyde, however, it does state that in order to mold a container that has high gas barrier properties, the resin mixture material should have as close to 30% by weight of the xylylene group-containing polyamide resin to PET as possible. Furthermore, it states that the use of 5 to 10% by weight of the xylylene group-containing polyamide resin to PET will result in a container that does not have high gas barrier properties.

The above mentioned patents are deficient because high molecular weight polyamides do not provide adequate reduction in residual acetaldehyde without imparting haze to the polyester. If small amounts of the high molecular weight polyamides are used in such patents, an acceptable level of haze can be achieved, however, residual acetaldehyde is very large. On the other hand, if larger amounts of the high molecular weight polyamides are used, residual acetaldehyde can be reduced but only at the expense of haze.

In contrast, the present inventor has unexpectedly discovered that polyamides selected from the group consisting of low molecular weight partially aromatic polyamides having a number average molecular weight of less than 15,000 and low molecular weight aliphatic polyamides having a number average molecular weight of less than 7,000, used in a critical amount are more effective in reducing residual acetaldehyde in polyethylene terephthalate based polyesters than high molecular weight polyamides. Moreover, the low molecular weight polyamides of the present invention used in a critical amount of 0.05 to 2.0 weight percent of the PET do not produce haze. Thus, the present invention has overcome the trade-off wherein low residual acetaldehyde could only be achieved at the expense of haze. In addition, the present inventors have determined that precompounded polyamide concentrates can be used to produce the polyester/polyamide blends of this invention.

SUMMARY OF THE INVENTION

It is therefore an object of the present invention to reduce residual acetaldehyde contained in a polyethylene terephthalate based polyester and improve the flavor retaining property and fragrance retaining property of a content in a vessel formed from this polyester.

Another object of the invention is to provide polyester/polyamide blends which exhibit superior clarity and processes for preparing said blends.

A further object of the invention is to provide polyester/polyamide blends which exhibit excellent mechanical properties such as impact resistance, stress crack resistance and heat resistance, and which display excellent melt flowability at the time of molding thereof, and to provide processes for preparing said blends.

These and other objects are accomplished herein by semi-crystalline polyester compositions having improved flavor retaining properties, comprising:

(A) 98.0 to 99.95 weight percent of a polyester which comprises (1) a dicarboxylic acid component comprising repeat units from at least 85 mole percent terephthalic acid; and (2) a diol component comprising repeat units from at least 85 mole percent ethylene glycol, based on 100 mole percent dicarboxylic acid and 100 mole percent diol; and (B) 2.0 to 0.05 weight percent of a polyamide selected from the group consisting of low molecular weight partially aromatic polyamides having a number average molecular weight of less than 15,000, low molecular weight aliphatic polyamides having a number average molecular weight of less than 7,000, and combinations thereof, wherein the combined weights of (A) and (B) total 100 percent.

The polyester/polyamide blends may be prepared using a polyamide concentrate comprising:

(A') 1 to 90 weight percent of a polymer selected from the group consisting of polycarbonates, polyesters and polyolefins; and (B) 10 to 99 weight percent of a polyamide selected from the group consisting of low molecular weight partially aromatic polyamides having a number average molecular weight of less than 15,000, low molecular weight aliphatic polyamides having a number average molecular weight of less than 7,000, and combinations thereof, wherein the combined weights of (A') and (B) total 100 percent.

DESCRIPTION OF THE INVENTION

The polyester, component (A), of the present invention is a polyethylene terephthalate (PET) resin. Copolyesters of PET can also be used. The polyethylene terephthalate resin contains repeat units from at least 85 mole percent terephthalic acid and at least 85 mole percent ethylene glycol, based on 100 mole percent dicarboxylic acid and 100 mole percent diol.

The dicarboxylic acid component of the polyester may optionally be modified with up to 15 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the polyester, component (A), may optionally be modified with up to 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The polyethylene terephthalate resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Polyesters comprising substantially only dimethyl terephthalate and ethylene glycol are preferred in the case where the blends of the present invention are used in making thermoformed crystallized PET articles.

Polyethylene terephthalate based polyesters of the present invention can be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid state polymerization methods.

The second component of the present invention, component (B), is a polyamide which is selected from the group consisting of low molecular weight partially aromatic polyamides having a number average molecular weight of less than 15,000 and low molecular weight aliphatic polyamides having a number average molecular weight of less than 7,000. Combinations of such polyamides are also included within the scope of the invention. By "partially aromatic polyamide" it is meant that the amide linkage of the partially aromatic polyamide contains at least one aromatic ring and a nonaromatic species. The partially aromatic polyamides have an I.V. of less than 0.8 dL/g. Preferably the I.V. of the partially aromatic polyamides is less than 0.7 dL/g and the number average molecular weight is less than 12,000. The aliphatic polyamides have an I.V. of less than 1.1 dL/g. Preferably the I.V. of the aliphatic polyamides is less than 0.8 dL/g and the number average molecular weight is less than 6,000.

The composition or articles of the present invention may contain up to about two weight percent of the low molecular weight polyamides and preferably less than one weight percent. It has been determined that the use of polyamides at greater than about two weight percent based on the weight of the polyester cause undesirable levels of haze and color.

Low molecular weight polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred low molecular weight partially aromatic polyamides include: poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide is poly(m-xylylene adipamide) having a number average molecular weight of 4,000 to 7,000 and an inherent viscosity of 0.3 to 0.6 dL/g. Preferred low molecular weight aliphatic polyamides include poly(hexamethylene adipamide) and poly(caprolactam). The most preferred low molecular weight aliphatic polyamide is poly(hexamethylene adipamide) having a number average molecular weight of 3,000 to 6,000 and an inherent viscosity of 0.4 to 0.9 dL/g.

The low molecular weight aliphatic and partially aromatic polyamides of the present invention used in conjunction with the polyester, component (A), uniformly decrease the acetaldehyde concentration in articles formed from such blends. The low molecular weight partially aromatic polyamides, however, are preferred over the aliphatic polyamides in cases where clarity and dispersibility are crucial.

The low molecular weight polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80° to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups which are available to react with acetaldehyde. If the diacid-diamine complex is prepared in a separate step, excess diamine is added prior to the polymerization. The polymerization can be carried out either at atmospheric pressure or at elevated pressures.

The process for preparing the polyester/polyamide blends of the present invention involve preparing the polyester and low molecular weight polyamide, respectively, by processes as mentioned previously. The polyester and polyamide are dried in an atmosphere of dried air or dried nitrogen, or under reduced pressure. The polyester and polyamide are mixed and subsequently melt compounded, for example, in a single or twin screw extruder. Melt temperatures must be at least as high as the melting point of the polyester and are typically in the range of 260°-310° C. Preferably, the melt compounding temperature is maintained as low as possible within said range. After completion of the melt compounding, the extrudate is withdrawn in strand form, and recovered according to the usual way such as cutting. Instead of melt compounding, the polyester and polyamide may be dry-blended and heat-molded or draw-formed into plastic articles.

The polyamide may be added in the form of a pre-compounded concentrate containing a polymer, component (A'), and the polyamide, component (B). The polymer is selected from polycarbonates, polyesters, polyolefins and combinations thereof. Preferred polyesters are polyethylene terephthalate (PET) and copolyesters of PET. The polyethylene terephthalate resin contains repeat units from at least 60 mole percent, preferably at least 85 mole percent, terephthalic acid, and at least 50 mole percent, preferably at least 85 mole percent, ethylene glycol, based on 100 mole percent dicarboxylic acid and 100 mole percent diol. The dicarboxylic acid and diol components are described above in the description of component (A). A preferred polycarbonate is bisphenol A polycarbonate. Preferred polyolefins are polyethylene and polypropylene.

The polymer, component (A'), and the polyamide, component (B), are melt blended in an extruder. In order to produce the final blend, the concentrate is added by either dry blending with the polyester pellets or using an auxiliary feed system to meter in the appropriate ratio of concentrate to the polyester. Preferably, the concentrate is prepared in a similar polyester as used in the final article. However, in some cases it may be advantageous to use another polymer in the concentrate, such as a polyolefin. In the case where a polyolefin/polyamide concentrate is blended with the polyester, the polyolefin is incorporated as a nucleator additive for the polyester, component (A).

Many other ingredients can be added to the concentrate. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art.

The acetaldehyde concentration in the final blend is determined by the amount of polyamide in the blend but is not dependant on the amount of polyamide in the concentrate. Therefore, a broad range of polyamide concentrations from 10 to 99 weight percent can be used in the concentrate.

Instead of using the concentrate, the polyamide may be added in the late stages of polyester manufacture. For example, the polyamide can be blended with the molten polyester as it is removed from the polycondensation reactor, before it is pelletized. This method, however, is not desirable if the polyester/polyamide blend will be subjected to solid state polymerization since undesirable color and/or haze may develop during extended time at elevated temperatures.

The blends of this invention serve as excellent starting materials for the production of moldings of all types by extrusion or injection molding. Specific applications include various packaging applications such as thermoformed or injection molded trays, lids and cups; injection stretch blow-molded bottles, film and sheet; extrusion blow-molded bottles and multilayer articles. Examples of package contents include, but are not limited to, food, beverages, and cosmetics.

Many other ingredients can be added to the compositions of the present invention to enhance the performance properties of the blends. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

In applications where a clear, colorless resin is desired, the slight yellow color generated during processing can be masked by addition of a blue dye. The colorant can be added to either component of the blend during polymerization or added directly to the blend during compounding. If added during blending, the colorant can be added either in pure form or as a concentrate. The amount of a colorant depends on its absorptivity and the desired color for the particular application. A preferred colorant is copper phthalocyanine.

Desirable additives also include impact modifiers and antioxidants. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

The materials and testing procedures used for the results shown herein are as follows:

POLYESTER A is essentially a homopolymer of polyethylene terephthalate having an I.V. of about 0.76 dL/g.

POLYESTER B is essentially a homopolymer of polyethylene terephthalate having an I.V. of about 0.90 dL/g.

POLYESTER C is a copolyester consisting of 100 mole percent terephthalic acid, 98 to 99 mole percent ethylene glycol and 1 to 2 mole percent 1,4-cyclohexanedimethanol, having an I.V. of about 0.76 dL/g.

POLYESTER D is a copolyester consisting of 100 mole percent terephthalic acid, 96 to 97 mole percent ethylene glycol and 3 to 4 mole percent 1,4-cyclohexanedimethanol, having an I.V. of about 0.76 dL/g.

POLYESTER E is a copolyester consisting of about 100 mole percent terephthalic acid, 65 to 70 mole percent ethylene glycol, and 30 to 35 mole percent 1,4-cyclohexanedimethanol, having an I.V. of about 0.74 dL/g.

Acetaldehyde generation (AA Gen) was determined by the following method. After crystallizing for 30 minutes at 180° C., the pelletized polyester was dried overnight at 120° C. in a vacuum oven. A Tinius-Olsen melt indexer was loaded with 5 grams of the polyester and held at the test temperature for five minutes. The molten polyester was extruded into water and stored at a temperature of −40° C. until grinding. The sample was ground to 20 mesh or finer and 0.5 grams was placed in a sample tube which was immediately sealed. The sample was analyzed by dynamic headspace gas chromatographic analysis using a Hewlett-Packard 5890 Gas Chromatograph with a Perkin Elmer Automatic Thermal Desorption ATD-50 as the injection system. Acetaldehyde was desorbed by heating the sample at 150° C. for ten minutes. The gas chromatography column was 30 meters in length by 0.53 mm inside diameter.

Acetaldehyde concentration after extrusion (Extrusion AA) was determined by grinding the pellets or sheet to 20 mesh or finer and measuring the acetaldehyde concentration by the same gas chromatographic method as described for acetaldehyde generation.

Color was determined according to ASTM D2244 using a Hunter Color Lab instrument. Color measurements are reported as Rd, a and b.

Haze was determined by ASTM D1003. Haze values of greater than 3.0% indicate visible haze.

Headspace acetaldehyde concentration (HSAA) in the bottles was determined by gas chromatography. The bottles were prepared by purging with nitrogen gas immediately after blowing and sealed. The bottles were then stored for 24 hours at 20°-23° C. and 50% relative humidity before being tested.

Inherent viscosity (I.V.) was measured at 25° C. using 0.50 grams of polymer per 100 ml of a solvent consisting of 60% by weight phenol and 40% by weight tetrachloroethane.

Number average molecular weights of the polyamides were determined by ebulliometry using hexafluoroisopropanol.

Terminal carboxyl group concentration was determined by potentiometric titration. One gram of polyamide was placed in 50 milliliters of benzyl alcohol and heated until dissolved. The titrant was 0.01N potassium hydroxide in isopropanol.

Terminal amino group concentration was determined by potentiometric titration. One gram of polyamide was dissolved in 90 ml of m-cresol at 25° C. The titrant was 0.01N perchloric acid in a ratio of 2:1 isopropanol/propylene glycol. The titrant was prepared from 70% perchloric acid in water.

The invention will be further illustrated by a consideration of the following examples, which are intended to be exemplary of the invention. All parts and percentages in the examples are on a weight basis unless otherwise stated.

EXAMPLE 1

Poly(hexamethylene adipamide) was prepared by the following procedure.

A mixture containing 5.19 kg of adipic acid, 6.18 kg of a 70% solution of hexamethylene diamine in water, and 3.64 kg of water, was prepared. The mixture was placed in a polymerization reactor under a nitrogen atmosphere and stirred for 30 minutes then heated to 150° C. and held for 60 minutes. The reactor was pressurized to 75 psi, then heated to 275° C. and held for 120 minutes. The poly(hexamethylene adipamide) was extruded into water, ground and dried. The number average molecular weight and I.V. of the poly(hexamethylene adipamide) were determined to be 3,600 and 0.61 dL/g, respectively. Terminal amino group concentration was 0.16 mmol/g and terminal carboxyl group concentration was 0.13 mmol/g.

A blend containing 25 weight percent of the poly(hexamethylene adipamide) with POLYESTER A was prepared by the following procedure.

The polyamide was dried for 16 hours at 120° C. in a ConAir drier. POLYESTER A was dried for 16 hours at 120° C. in a ConAir drier. The polyamide, 3.97 kg and POLYESTER A, 11.92 kg, were dry blended, extruded, and pelletized at a melt temperature of 277° C. using a 1.25 inch Sterling single-screw extruder fitted with a medium screw. Temperature settings on the extruder for zones 1–5 were 250°, 260°, 270°, 270° and 265° C. respectively.

Sheet was extruded from POLYESTER B containing the above blend at 2.0 and 4.0 weight percents along with 3.0 weight percent of a polyethylene nucleating agent. POLYESTER B was dried for 4 hours at 150° C. The polyamide concentrate was dry blended with POLYESTER B and the nucleating agent was added using an auxiliary feed system. The extruder was a 3.5 inch 24:1 Prodex extruder with a 100 HP Eddy current drive using a Welex 3-roll stack take-off with 12 inch diameter rolls. The screw was an efficient type with no mixer. The extrusion conditions were: cylinder zones 1–5 temperatures 325°, 320°, 305°, 295° and 295° C., gate and head 280° C., adapter 280° C., die zones 1–5 temperatures 280°260°, 260°, 260° and 260° C., screw speed 35 rpm, roll temperature (top/middle/bottom) 50°/60°/70° C. Sheet thickness was 30 mil. Acetaldehyde generated from the blends is summarized in Table I.

EXAMPLE 2

Poly(hexamethylene adipamide) was prepared according to Example 1 and blended with POLYESTER B using the following procedure.

The poly(hexamethylene adipamide) was pulverized and subsequently dried at 120° C. for 48 hours in a vacuum oven. POLYESTER B was dried in a ConAir drier for 16 hours at 150° C. The polyamide powder was dry blended with the POLYESTER B pellets in concentrations as listed in Table I. The blends were extruded and pelletized at 285° C. die temperature using a ¾ in. Brabender extruder fitted with a mixing screw. Acetaldehyde generated from the blends is summarized in Table I.

EXAMPLE 3

Poly(hexamethylene adipamide) was prepared by the following procedure.

A mixture containing 5.05 kg of adipic acid, 6.31 kg of a 70% solution of hexamethylene diamine in water, and 3.64 kg of water, was prepared. The mixture was reacted and extruded as in Example 1. The number average molecular weight and I.V. of the poly(hexamethylene adipamide) was determined to be 2,500 and 0.43 dL/g, respectively. Terminal amino group concentration was 0.28 mmol/g and terminal carboxyl group concentration was 0.13 mmol/g.

Poly(hexamethylene adipamide) prepared according to the above procedure was used to prepare blends with POLYESTER B using the same procedure as in Example 2. Acetaldehyde generated from the blends is summarized in Table I.

EXAMPLE 4

Poly(hexamethylene adipamide) was prepared by the following procedure.

A mixture containing 4.93 kg of adipic acid, 6.44 kg of a 70% solution of hexamethylene diamine in water, and 3.64 kg of water, was prepared. The mixture was reacted and extruded as in Example 1. The number average molecular weight and I.V. of the poly(hexamethylene adipamide) was determined to be 2,300 and 0.31 dL/g, respectively.

Poly(hexamethylene adipamide) prepared according to the above procedure was used to prepare blends with POLYESTER B using the same procedure as in Example 2. Acetaldehyde generated from the blends is summarized in Table I.

EXAMPLE 5

A blend containing 25 weight percent of commercial grade poly(hexamethylene adipamide) having an I.V. of 1.2 dL/g in POLYESTER A was prepared according to the procedure set forth in Example 1.

Sheet was extruded from POLYESTER B containing the above blend according to the procedure in Example 1. Acetaldehyde generated from the blends is summarized in Table I.

EXAMPLE 6

Commercial grade poly(hexamethylene adipamide) having an I.V. of 1.2 dL/g was used to prepare blends with POLYESTER B according to the procedure set forth in Example 2. Acetaldehyde generated from the blends is summarized in Table I.

TABLE I

| | Poly(hexamethylene adipamide) Blends | | | | |
|---|---|---|---|---|---|
| Ex. | Polyamide (wt %) | I.V. (dL/g) | Extrusion AA (ppm) | AA Gen at 275° C. (ppm) | AA Gen at 295° C. (ppm) |
| 1 | 0.0 | | 9.3 | | |
| 1 | 0.5 | 0.61 | 1.1 | | |
| 1 | 1.0 | 0.61 | 0.8 | | |
| 2 | 0.0 | | 13.4 | 13.8 | 29.2 |
| 2 | 0.5 | 0.61 | 1.5 | 3.4 | 10.3 |
| 2 | 1.0 | 0.61 | 0.9 | 1.9 | 5.1 |
| 3 | 0.0 | | 13.4 | 13.8 | 29.2 |
| 3 | 0.5 | 0.43 | 0.8 | 2.8 | 8.7 |
| 3 | 1.0 | 0.43 | 0.7 | 1.3 | 3.7 |
| 4 | 0.0 | | 13.0 | 12.3 | 25.3 |
| 4 | 0.5 | 0.31 | 0.6 | 2.7 | 9.0 |
| 4 | 1.0 | 0.31 | 0.6 | 1.3 | 3.9 |
| 5 | 0.0 | | 9.3 | | |
| 5 | 0.5 | 1.20 | 9.8 | | |
| 5 | 1.0 | 1.20 | 7.2 | | |
| 6 | 0.0 | | 12.0 | 15.2 | 29.2 |
| 6 | 0.5 | 1.20 | 7.8 | 7.0 | 12.5 |

The results in Table I clearly indicate that polyethylene terephthalate type blends containing poly(hexamethylene adipamide) have decreased acetaldehyde concentrations. In addition, the results illustrate that the low molecular weight poly(hexamethylene adipamide) polyamides of the present invention, as determined by the inherent viscosities, used in critical amounts are more effective in reducing the concentration of acetaldehyde in such polyesters than the high molecular weight polyamides used in Examples 5 and 6. Moreover, Examples 2, 3 and 4 illustrate the inverse relationship between the molecular weight of the polyamide and its effectiveness in decreasing acetaldehyde concentration.

EXAMPLE 7

Poly(caprolactam), Nylon-6, was prepared by the following procedure.

A mixture containing 131.0 grams of aminocaproic acid and 60.0 grams of water, was prepared. The mixture was placed in a polymerization reactor under a nitrogen atmosphere and stirred for 30 minutes while being heated to reflux. Water was distilled off and the mixture was heated to 275° C. and held for 30 minutes. The mixture was stirred at 275° C. for 20 minutes. The polycaprolactam had an I.V. of 0.47 dL/g. Increasing the final step in the reaction to 30 minutes yielded poly(caprolactam) with an I.V. of 0.63 dL/g.

The poly(caprolactam) prepared according to the above procedure was used to prepare blends with POLYESTER B. The polyamide was pulverized and subsequently dried at 120° C. for 48 hours in a vacuum oven. POLYESTER B was dried in a ConAir drier for 16 hours at 150° C. The polyamide powder was dry blended with the POLYESTER B pellets in a concentration of 0.5 weight percent. The blends were extruded and pelletized at a die temperature of 285° C. using a ⅜ in. Brabender extruder fitted with a mixing screw. Acetaldehyde generated from the blends is summarized in Table II.

EXAMPLE 8

Commercial grade poly(caprolactam) having an I.V. of 1.3 dL/g was used to prepare blends with POLYESTER B according to the procedure set forth in Example 7. Acetaldehyde generated from the blends is summarized in Table II.

TABLE II

| | Poly(caprolactam) Blends | | | | |
|---|---|---|---|---|---|
| Ex. | Polyamide (wt %) | I.V. (dL/g) | Pellet AA (ppm) | AA Gen at 275° C. (ppm) | AA Gen at 295° C. (ppm) |
| 7 | 0.0 | | 12.0 | 15.2 | 29.2 |
| 7 | 0.5 | 0.47 | 3.5 | 4.4 | 11.7 |
| 7 | 0.5 | 0.63 | 5.6 | 5.7 | 12.9 |
| 8 | 0.0 | | 12.0 | 15.2 | 29.2 |
| 8 | 0.5 | 1.30 | 6.9 | 7.6 | 15.4 |

The results in Table II clearly indicate that polyethylene terephthalate type blends containing poly(caprolactam) have decreased acetaldehyde concentrations. In addition, the results illustrate that the low molecular weight poly(caprolactam) polyamides, as determined by the inherent viscosities, of the present invention used in a critical amount are more effective in reducing the concentration of acetaldehyde in such polyesters than the high molecular weight polyamide used in Example 8.

EXAMPLE 9

Poly(m-xylylene adipamide) was prepared by the following procedure.

A mixture containing 4.32 kg of adipic acid, 4.82 kg of m-xylylenediamine and 7.72 kg of water, was prepared. The mixture was placed in a polymerization reactor under a nitrogen atmosphere. The mixture was heated with stirring to reflux for 30 minutes. The mixture was heated to 120° C. and held for 60 minutes while water was distilled off. The temperature was then increased to 275° C. over a period of 3.25 hours. The mixture was stirred at 275° C. for 30 minutes. The poly(m-xylylene adipamide) was extruded into water, ground and dried. The number average molecular weight and I.V. of the poly(m-xylylene adipamide) was determined to be 2,300 and 0.27 dL/g, respectively.

Poly(m-xylylene adipamide) prepared according to the above procedure was used to prepare a concentrate containing 25 weight percent of the polyamide in POLYESTER A. The polyamide was pulverized and subsequently dried at 120° C. for 16 hours in a vacuum oven. POLYESTER A was dried for 16 hours at 150° C. in a ConAir drier. The polyamide powder was dry blended with the POLYESTER A pellets in concentrations of 25 weight percent. The blends were extruded and pelletized at a die temperature of about 260°–275° C. using a 1.25 inch Killion single screw extruder.

Sheet was extruded from POLYESTER B containing the above blend at 2.0 and 4.0 weight percent with 3.0 weight percent of a polyethylene nucleating agent. POLYESTER B was dried for 4 hours at 150° C. The polyamide concentrate was dry blended with POLYESTER B and the nucleating agent was added using an auxiliary feed system. The extruder was a 3.5 inch, 24:1 Prodex extruder with a 100 HP Eddy current drive using a Welex 3-roll stack take-off with 12 inch diameter rolls. The screw was an efficient type with no mixer. The extrusion conditions were: cylinder zones 1–5 temperatures 310°, 315°, 300°, 290° and 290° C., respectively, gate and head 265° C., adapter 265° C., die zones 1–5 temperatures 275°, 270°, 270°, 270° and 270° C. respectively, screw speed at 0, 2 and 4 weight percent polyamide concentration was 31, 32 and 35 rpm, respectively, roll temperature at the top, middle and bottom was 55°, 60° and 66° C., respectively. Sheet thickness was 30 mil.

Trays were thermoformed using a 24 inch Lyle continuous roll-fed thermoformer fitted with hot-mold/cold-mold capability. The thermoforming conditions were: heater zones 1–8 temperatures 415°, off, 350°, 260°, 260°, 260°, 350° C. and off, hot mold 205° C., cold mold 77° C., cycle time at polyamide concentrate of 0, 2 and 4 weight percent 3.95, 3.90 and 4.10 seconds, respectively.

Thermoformed PET trays produced by this method had 0.5 ppm acetaldehyde with 0.5 weight percent polyamide, 0.2 ppm acetaldehyde with 1.0 weight percent polyamide, and 12.2 ppm acetaldehyde without polyamide. Thus, the low molecular weight polyamides of the present invention used in a critical amount reduce the acetaldehyde concentration in thermoformed crystallized PET trays by as much as sixty fold.

EXAMPLE 10

Poly(m-xylylene adipamide) was prepared by the following procedure.

A mixture containing 43.8 grams of adipic acid, 53.0 grams of m-xylylenediamine (30% molar excess) and 50.0 grams of water, was prepared. The mixture was placed in a 500 mL flask under a nitrogen atmosphere. The mixture was heated with stirring to reflux for 20–30 minutes. Water was distilled off and the temperature was increased to 275° C. over a period of 30 minutes. The mixture was stirred at 275° C. for 30 minutes. Poly(m-xylylene adipamide) produced by this method had an I.V. of 0.20 dL/g.

Blends of the poly(m-xylylene adipamide) prepared above, with POLYESTER C were prepared by the following procedure.

The polyamide was pulverized and subsequently dried at 120° C. for 48 hours in a vacuum oven. POLYESTER C was dried in a ConAir drier for 16 hours at 150° C. The polyamide powder was dry blended with the POLYESTER C pellets in concentrations of 0.1, 0.3 and 0.5 weight percent. The blends were extruded and pelletized at a die temperature of 270° C. using a ⅜ in. Brabender extruder fitted with a mixing screw. Acetaldehyde generated from the blends is summarized in Tables III and VI.

Bottles were prepared by the following procedure. The poly(m-xylylene adipamide) prepared above, 10 grams in 1990 grams of polyethylene terephthalate, was dry blended with POLYESTER C. Bottle preforms were injection molded at a melt temperature of 275° C. using a Cincinnati Milacron Model PC-3 molding machine fitted with a single cavity preform mold. The preforms were reheat blow-molded into ½-liter bottles. Bottle headspace, sidewall haze and acetaldehyde generated from the blends is summarized in Table VI.

EXAMPLE 11

Poly(m-xylylene adipamide) was prepared by the following procedure.

A mixture containing 43.80 grams of adipic acid, 48.96 grams of m-xylylenediamine (20% molar excess) and 50 grams of water, was prepared. The mixture was prepared and polymerized according to the procedure set forth in Example 10. The poly(m-xylylene adipamide) had an I.V. of 0.26 dL/g.

Blends of the poly(m-xylylene adipamide) with POLYESTER C were prepared as in Example 10. Acetaldehyde generated from the blends is summarized in Table III.

EXAMPLE 12

Poly(m-xylylene adipamide) was prepared by the following procedure.

A mixture containing 43.80 grams of adipic acid, 43.86 grams of m-xylylenediamine (7.5% molar excess) and 50 grams of water, was prepared. The mixture was prepared and polymerized according to the procedure set forth in Example 10. The poly(m-xylylene adipamide) had an I.V. of 0.44 dL/g.

Blends of the poly(m-xylylene adipamide) with POLYESTER C were prepared as in Example 10. Acetaldehyde generated from the blends is summarized in Tables III and VI.

Bottles were prepared as in Example 10. Bottle headspace, sidewall haze and acetaldehyde generated from the blends is summarized in Table VI.

EXAMPLE 13

Poly(m-xylylene adipamide) was prepared by the following procedure.

A mixture containing 43.80 grams of adipic acid, 42.84 grams of m-xylylenediamine (5% molar excess) and 50.0 grams of water were placed in a 500 ml flask under a nitrogen atmosphere. The mixture was prepared and polymerized according to the procedure set forth in Example 10. The poly(m-xylylene adipamide) had a I.V. of 0.53 dL/g and a number average molecular weight of 7,030. Terminal amino group concentration was 0.13 mmol/g. Terminal carboxyl group concentration was 0.035 mmol/g.

Blends of the poly(m-xylylene adipamide) with POLYESTER C were prepared as in Example 10. Acetaldehyde generated from the blends is summarized in Table III.

EXAMPLE 14

Poly(m-xylylene adipamide) was prepared by the following procedure.

A mixture containing 43.80 grams of adipic acid, 41.82 grams of m-xylylenediamine (2.5% molar excess) and 50 grams of water were placed in a 500 ml flask under a nitrogen atmosphere. The mixture was prepared and polymerized according to the procedure set forth in Example 10. The poly(m-xylylene adipamide) had a I.V. of 0.70 dL/g and a number average molecular weight of 10,500. Terminal amino group concentration was 0.049 mmol/g. Terminal carboxyl group concentration was 0.039 mmol/g.

Blends of the poly(m-xylylene adipamide) with POLYESTER C were prepared as in Example 10. Acetaldehyde generated from the blends is summarized in Table III.

EXAMPLE 15

Poly(m-xylylene adipamide) was prepared by the following procedure.

A mixture containing 51.10 grams of adipic acid, 48.79 grams of m-xylylenediamine and 60.0 grams of water, was prepared. The mixture was prepared and polymerized according to the procedure set forth in Example 10. The poly(m-xylylene adipamide) had a I.V. of 1.0 dL/g.

Blends of the poly(m-xylylene adipamide) with POLYESTER C were prepared as in Example 10. Acetaldehyde generated from the blends is summarized in Tables III and VI.

Bottles were prepared as in Example 10. Bottle headspace, sidewall haze and acetaldehyde generated from the blends is summarized in Table VI.

TABLE III

| | Poly(m-xylylene adipamide) Blends | | | |
|---|---|---|---|---|
| Ex. | Polyamide (wt %) | I.V. (dL/g) | AA Gen at 275° C. (ppm) | AA Gen at 295° C. (ppm) |
| 10 | 0.0 | | 14.0 | 31.9 |
| | 0.1 | 0.20 | 6.3 | 17.4 |
| | 0.3 | 0.20 | 2.9 | 10.7 |
| | 0.5 | 0.20 | 2.0 | 8.5 |
| 11 | 0.0 | | 14.0 | 31.9 |
| | 0.1 | 0.26 | 9.0 | 18.0 |
| | 0.3 | 0.26 | 3.7 | 13.0 |
| | 0.5 | 0.26 | 3.8 | 10.0 |
| 12 | 0.0 | | 14.0 | 31.9 |
| | 0.1 | 0.44 | 9.3 | 22.4 |
| | 0.3 | 0.44 | 5.4 | 16.0 |
| | 0.5 | 0.44 | 3.4 | 9.7 |
| 13 | 0.0 | | 14.0 | 31.9 |
| | 0.1 | 0.53 | 9.5 | 21.2 |
| | 0.3 | 0.53 | 6.7 | 15.2 |
| | 0.5 | 0.53 | 4.6 | 14.1 |
| 14 | 0.0 | | 14.0 | 31.9 |
| | 0.1 | 0.70 | 10.1 | 23.5 |
| | 0.3 | 0.70 | 9.1 | 22.2 |
| | 0.5 | 0.70 | 6.8 | 15.6 |
| 15 | 0.0 | | 14.0 | 31.9 |
| | 0.1 | 1.00 | 12.6 | 27.5 |
| | 0.3 | 1.00 | 12.0 | 25.5 |
| | 0.5 | 1.00 | 10.5 | 21.2 |

The results in Table III clearly indicate that polyethylene terephthalate type blends containing poly(m-xylylene adipamide) have decreased acetaldehyde concentrations. In addition, the results illustrate that the low molecular weight poly(m-xylylene adipamide) polyamides of the present invention used in a critical amount are more effective in reducing the concentration of acetaldehyde in such polyesters than the high molecular weight polyamide used in Example 15. Moreover, Examples 10–14 illustrate the inverse relationship between the molecular weight of the polyamide and its effectiveness in decreasing acetaldehyde concentration.

EXAMPLE 16

The poly(hexamethylene adipamide) prepared according to Example 1 having an I.V. of 0.61 was blended with POLYESTER B, a polyethylene nucleating agent and $TiO_2$. The blend was extruded into film using the following procedure.

The poly(hexamethylene adipamide) was pulverized and subsequently dried at 120° C. for 48 hours in a vacuum oven. POLYESTER B was dried in a ConAir drier for 16 hours at 150° C. The $TiO_2$ was added as a 50 weight percent blend in POLYESTER A. The $TiO_2$ blend was dried at 120° C. for 48 hours in a vacuum oven. All of the blends contained 3.3 weight percent of the polyethylene nucleating agent. Concentrations of polyamide and $TiO_2$ are listed in Table IV. The components were dry blended and subsequently extruded into 30 mil film using a Killion 1.25 inch extruder with a die temperature of 285° C. Film samples were crystallized in a forced air oven for 30 minutes at 180° C. Color measurements on the crystallized films are listed in Table IV.

A blend of POLYESTER B containing 3.3 weight percent of a polyethylene nucleating agent, 0.75 weight percent of the poly(hexamethylene adipamide) having an I.V. of 0.61, and 0.5 weight percent of $TiO_2$, was prepared by extruding the dry blended components at a die temperature of 285° C. using a ⅜ in. Brabender extruder fitted with a mixing screw. The blend had 1.0 ppm pellet AA compared to 7.7 ppm pellet AA for PET containing the nucleating agent but no polyamide or $TiO_2$.

TABLE IV

Color Analysis for Poly(hexamethylene adipamide) Blends

| Ex. | Polyamide (wt %) | $TiO_2$ (wt %) | $R_d$ | a | b |
|---|---|---|---|---|---|
| 16 | 0.0 | 0 | 73.7 | −2.4 | 5.9 |
| 16 | 0.5 | 0 | 71.7 | −4.1 | 11.9 |
| 16 | 0.5 | 0.25 | 74.1 | −3.5 | 9.9 |
| 16 | 0.5 | 0.5 | 73.9 | −2.8 | 7.9 |
| 16 | 0.5 | 1.0 | 78.1 | −2.5 | 7.5 |

The results in Table IV clearly indicate that the opaque whiteness of polyethylene terephthalate blends containing polyamides such as poly(hexamethylene adipamide) is improved by adding titanium dioxide. Moreover, the addition of titanium dioxide decreases the yellowness of such blends.

EXAMPLE 17

Poly(m-xylylene adipamide) was prepared by the following procedure.

A mixture containing 2.69 kg of adipic acid, 2.76 kg of m-xylylenediamine (10% molar excess) and 4.82 kg of water, was prepared. The mixture was placed in a polymerization reactor under a nitrogen atmosphere. The mixture was heated with stirring to reflux for 30 minutes. The mixture was heated to 120° C. and held for 60 minutes while water was distilled off. The temperature was then increased to 275° C. over a period of 3.25 hours. The mixture was stirred at 275° C. for 30 minutes. The poly(m-xylylene adipamide) was extruded into water, ground and dried. The number average molecular weight and I.V. of the poly(m-xylylene adipamide) was determined to be 6,730 g/mole and 0.41 dL/g, respectively.

Blends of the poly(m-xylylene adipamide) prepared above, with POLYESTER C were prepared by the following procedure.

The polyamide was pulverized and subsequently dried at 120° C. for 48 hours in a vacuum oven. POLYESTER C was dried in a ConAir drier for 16 hours at 150° C. The polyamide powder was dry blended with the POLYESTER C pellets at a concentration of 0.5 weight percent. The blend was extruded and pelletized at a die temperature of 270° C. using a ⅜ in. Brabender extruder fitted with a mixing screw. Acetaldehyde generated from the blends is summarized in Table VI.

Bottles were prepared by the following procedure. The poly(m-xylylene adipamide) prepared above, 0.34 kg, was dry blended with 65.58 kg of POLYESTER C and 2.18 kg of a concentrate containing 250 ppm of 1-cyano-6-(4-(2-hydroxyethyl)anilino)-3-methyl-3H-dibenzo(F,I,J)isoquinoline-2,7-dione. The blend contained 8 ppm of the colorant. The concentrate was prepared by adding 1-cyano-6-(4-(2-hydroxyethyl)anilino)-3-methyl-3H-dibenzo(F,I,J)isoquinoline-2,7-dione during polymerization to a batch of PET after the transesterification step, before polycondensation. The PET base for the concentrate was prepared from dimethyl terephthalate and ethylene glycol using standard melt phase polymerization methods. The polyester resin was dried in a forced-air drier. Bottle preforms were molded using a two-stage stretch blow-molding process on a Husky XL225 injection molding machine fitted with an eight cavity preform mold. Bottle preforms were molded at a melt temperature of 275°–300° C. Preforms were stored at ambient conditions for 24 hours before the bottle blowing step. Bottles were blown by reheating preforms using a quartz lamp. The preforms were heated slightly above the glass transition temperature and pressurized to blow them into a 2-liter bottle shaped mold. Bottle headspace, sidewall haze and acetaldehyde generated from the blends is summarized in Table V. Each blend was tested eight times and the standard deviations for head space acetaldehyde residual (HSAA) for the eight bottles is listed in parentheses.

TABLE V

Low Molecular Weight Polyamides and Haze

| Polyamide (wt %) | Melt Temperature (°C.) | HSAA (mg/l) | Haze (%) |
|---|---|---|---|
| 0 | 279 | 2.36 (0.09) | |
| 0 | 288 | 3.28 (0.38) | 0.7 |
| 0 | 293 | 3.46 (0.15) | |
| 0.5 | 276 | 0.28 (0.04) | |
| 0.5 | 284 | 0.38 (0.06) | 1.2 |
| 0.5 | 293 | 0.39 (0.05) | |

The data in Table V indicates that the use of the polyamides of the present invention cause slight increases in the level of haze. It is also important to note that as melt temperature is increased, the acetaldehyde generated increases.

EXAMPLE 18

Poly(m-xylylene adipamide) was prepared by the following procedure.

A mixture containing 43.80 grams of adipic acid, 46.92 grams of m-xylylenediamine (15% molar excess) and 50.0 grams of water were placed in a 500 ml flask under a nitrogen atmosphere. The mixture was prepared and polymerized according to the procedure set forth in Example 10. The poly(m-xylylene adipamide) had a I.V. of 0.31 dL/g and a number average molecular weight of 3,050 g/mole. Terminal amino group concentration was 0.42 mmol/g. Terminal carboxyl group concentration was 0,011 mmol/g.

Blends of the poly(m-xylylene adipamide) with POLYESTER C were prepared as in Example 17. Acetaldehyde generated from the blends is summarized in Table VI.

Bottles were prepared as in Example 10. Bottle headspace, sidewall haze and acetaldehyde generated from the blends is summarized in Table VI.

EXAMPLE 19

Poly(hexamethylene isophthalamide) was prepared by the following procedure.

A mixture containing 98.7 grams of preformed salt of isophthalic acid and hexamethylene diamine, 10.36 grams of a 70% solution of hexamethylene diamine in water, (15% molar excess), and 60.0 grams of water were placed in a 500 ml flask under a nitrogen atmosphere. The mixture was heated with stirring to reflux for 20–30 minutes. Water was distilled off and the temperature was increased to 285° C. over a period of 30 minutes. The mixture was stirred at 285° C. for 30 minutes. The poly(hexamethylene isophthalamide) was extruded into water, ground and dried. The poly(hexamethylene isophthalamide) had an I.V. of 0.15 dL/g.

Blends of the poly(hexamethylene isophthalamide) prepared above, with POLYESTER C were prepared by the following procedure.

The polyamide was pulverized and subsequently dried at 120° C. for 48 hours in a vacuum oven. POLYESTER C was dried in a ConAir drier for 16 hours at 150° C. The polyamide powder was dry blended with the POLYESTER C pellets at a concentration of 0.5 weight percent. The blend was extruded and pelletized at a die temperature of 270° C. using a ¾ in. Brabender extruder fitted with a mixing screw. Acetaldehyde generated from the blends is summarized in Table VI.

Bottles were prepared as in Example 10. Bottle headspace, sidewall haze and acetaldehyde generated from the blends is summarized in Table VI.

EXAMPLE 20

MXD6 polyamide from Mitsubishi Gas Chemical Company, Grade #6001 having an I.V. of 0.85, was pulverized and dried at 120° C. for 48 hours in a vacuum oven. Blends of 0.25 and 0.5 weight percent MXD6 polyamide were prepared by drum tumbling POLYESTER C with the dried polyamide powder. Preforms were injection molded at a melt temperature of 287° C. on a Husky XL225 injection molding machine fitted with an 8 cavity preform mold. The preforms were reheat blow-molded into 2-liter bottles. Bottle headspace, sidewall haze and acetaldehyde generated from the blends is summarized in Table VI.

EXAMPLE 21

Commercial molding grade poly(caprolactam) having an I.V. of 1.4 dL/g, was pulverized and subsequently dried at 120° C. for 48 hours in a vacuum oven.

Bottles were prepared as in Example 11. Bottle headspace, sidewall haze and acetaldehyde generated from the blends is summarized in Table VI.

EXAMPLE 22

MXD6 polyamide from Mitsubishi Gas Chemical Company, Grade #6001 having an I.V. of 0.85 dL/g, was pulverized and subsequently dried at 120° C. for 48 hours in a vacuum oven.

Bottles were prepared as in Example 11. Bottle headspace, sidewall haze and acetaldehyde generated from the blends is summarized in Table VI.

TABLE VI

| | | | Residual Acetaldehyde and Haze | | | |
| Ex. | Polyamide I.V. (dL/g) | Polyamide (Wt %) | AA Gen 275° C. (ppm) | AA Gen 295° C. (ppm) | HSAA (mg/L) | Haze (%) |
| --- | --- | --- | --- | --- | --- | --- |
| 10 | 0.20 | 0 | 14.0 | 31.9 | 3.2 | 2.2 |
| | | 0.1 | 6.3 | 17.4 | — | — |
| | | 0.3 | 2.9 | 10.7 | — | — |
| | | 0.5 | 2.0 | 8.5 | <0.5 | 2.3 |
| 12 | 0.44 | 0 | 14.0 | 31.9 | 3.2 | 2.2 |
| | | 0.1 | 9.3 | 22.4 | — | — |
| | | 0.3 | 5.4 | 16.0 | — | — |
| | | 0.5 | 3.4 | 9.7 | <0.5 | 2.3 |
| 15 | 1.0 | 0 | 14.0 | 31.9 | 3.2 | 2.2 |
| | | 0.1 | 12.6 | 27.5 | — | — |
| | | 0.3 | 12.0 | 25.5 | — | — |
| | | 0.5 | 10.5 | 21.2 | 1.2 | 4.0 |
| 17 | 0.41 | 0 | 11.0 | 23.7 | 2.4 | 0.7 |
| | | 0.5 | 2.7 | 8.9 | 0.3 | 1.2 |
| 18 | 0.31 | 0 | — | — | 3.2 | 2.2 |
| | | 0.5 | — | — | <0.5 | 2.5 |
| 19 | 0.15 | 0 | 9.6 | 19.0 | 2.0 | — |
| | | 0.5 | 2.7 | 10.5 | 0.5 | — |
| 20 | 0.85 | 0 | — | — | 2.4 | 0.9 |
| | | 0.25 | — | — | 1.5 | 1.6 |
| | | 0.5 | — | — | 1.3 | 2.1 |
| 21 | 1.4 | 0 | — | — | 3.3 | 2.2 |
| | | 0.5 | — | — | 2.0 | >12 |
| | | 1.0 | — | — | 0.9 | >20 |
| | | 2.0 | — | — | 0.6 | >28 |
| 22 | 0.85 | 0 | — | — | 3.3 | 2.2 |
| | | 0.5 | — | — | 2.5 | 2.7 |
| | | 1.0 | — | — | 1.9 | 3.5 |
| | | 2.0 | — | — | 0.9 | 7.0 |

The results in Table VI illustrate that the low molecular weight polyamides of the present invention used in a critical amount are more effective in reducing the concentration of acetaldehyde in PET based polyesters than the high molecular weight polyamides used in Examples 15 and 20–22. Simultaneously, the low molecular weight polyamides of the present invention used in a critical amount do not produce any visible haze. For example, a head space acetaldehyde value of less than one with a percent haze of less than 3 is only achieved using the low molecular weight polyamides of the present invention. In contrast, Examples 15 and 20–22, which are used as comparative examples, are unable to achieve low head space acetaldehyde values and low haze values simultaneously. The problem in the comparative examples is that if small amounts of the high molecular weight polyamides are used, an acceptable level of haze can be achieved, however, residual acetaldehyde is very large. On the other hand, if larger amounts of the high molecular weight polyamides are used, residual acetaldehyde can be reduced but only at the expense of haze. Thus, the present invention has overcome the trade-off wherein low residual acetaldehyde could only be achieved at the expense of haze.

EXAMPLE 23

Poly(m-xylylene adipamide) was prepared by the following procedure.

Adipic acid (4.38 kg), m-xylylenediamine (4.56 kg) and water (7.6 kg) were placed in a polymerization reactor under a nitrogen atmosphere. The mixture was heated with stirring to reflux for 30 min. The mixture was heated to 120° C. and held for 60 min. The temperature was then increased to 275° C. over 3 hr 15 min. The mixture was stirred at 275° C. for 30 min. The polymer was extruded into water, ground, and dried. Poly(m-xylylene adipamide) produced by this method had 0.46 dL/g inherent viscosity. The polyamide had a number average molecular weight of 5,800 g/mol by endgroup titration.

A blend (concentrate) of 0.46 dL/g IhV poly(m-xylylene adipamide) with Polyester D was prepared by the following procedure. The polyester was dried in a ConAir drier for 16 hr at 150° C. The granulated polyamide was dry blended with the polyester pellets at a concentration of 25 wt %. This mixture was extruded and pelletized using a 28 mm Werner-Pfleiderer twin-screw extruder.

Blends of the poly(m-xylylene adipamide)/PET concentrate with Polyester D were prepared by the following procedure. The polyester was dried in a ConAir drier for 16 hr at 150° C. The polyamide concentrate was dry blended with the polyester pellets in concentrations of 1 and 2 wt %. These mixtures were extruded and pelletized at 275° C. die temperature using a ¾ in. Brabender extruder fitted with a mixing screw. Acetaldehyde generation for these blends is reported in Table VII.

TABLE VII

| | Poly(m-xylylene adipamide)/PET Concentrate | | |
|---|---|---|---|
| Ex. | Concentrate (wt %) | Extrusion AA (ppm) | AA Gen at 275° C. (ppm) | AA Gen at 295° C. (ppm) |
| 23 | 0 | 2.7 | 7.9 | 24.1 |
| 23 | 1.0 | 1.0 | 4.6 | 16.8 |
| 23 | 2.0 | 0.5 | 3.1 | 9.1 |

EXAMPLE 24

Poly(m-xylylene adipamide) was prepared by the following procedure.

Adipic acid (2.69 kg), m-xylylenediamine (2.76 kg, 10% molar excess) and water (4.82 kg) were placed in a polymerization reactor under a nitrogen atmosphere. The mixture was heated with stirring to reflux for 30 min. The mixture was heated to 120° C. and held for 60 min. The temperature was then increased to 275° C. over 3 hours and 15 min. The mixture was stirred at 275° C. for 30 min. The polymer was extruded into water, ground, and dried. Poly(m-xylylene adipamide) produced by this method had 0.41 dL/g inherent viscosity.

A blue colored concentrate of 0.41 dL/g IhV poly(m-xylylene adipamide) with Polyester D was prepared by the following procedure. The polyester was dried in a ConAir drier for 16 hr at 150° C. The granulated polyamide was dry blended with the polyester pellets at a concentration of 25 wt % Additionally, 600 ppm copper phthalocyanine blue and 800 ppm Solvaperm HS-400 red were dry blended in the form of precompounded polyester based colorant concentrates. This mixture was extruded and pelletized using a 28 mm Werner-Pfleiderer twin-screw extruder.

Blends of the blue colored poly(m-xylylene adipamide)/PET concentrate with Polyester D were prepared by the following procedure. The polyester was dried in a ConAir drier for 16 hr at 150° C. The polyamide concentrate was dry blended with the polyester pellets in concentrations of 1 and 2 wt %. These mixtures were extruded and pelletized at 275° C. die temperature using a ¾ in. Brabender extruder fitted with a mixing screw. Acetaldehyde generation for these blends is reported in Table VIII.

TABLE VIII

| | Poly(m-xylylene adipamide)/PET Concentrate | | |
|---|---|---|---|
| Ex. | Concentrate (wt %) | Extrusion AA (ppm) | AA Gen at 275° C. (ppm) | AA Gen at 295° C. (ppm) |
| 24 | 0 | 2.7 | 7.9 | 24.1 |
| 24 | 1.0 | 0.8 | 4.2 | 13.2 |
| 24 | 2.0 | 0.5 | 2.5 | 10.6 |

EXAMPLE 25

Poly(hexamethylene adipamide) was prepared by the following procedure.

Adipic acid (5.19 kg), hexamethylene diamine (6.18 kg, 70% in water), and water (3.64 kg) were placed in a polymerization reactor under a nitrogen atmosphere. The mixture was stirred for 30 min then heated to 150° C. and held for 60 min. The reactor was pressurized to 75 psi, then heated to 275° C. and held for 120 min. The polymer was extruded into water, ground, and dried. Poly(hexamethylene adipamide) produced by this method had 0.61 dL/g inherent viscosity. The polyamide had a number average molecular weight of 3,600 by ebulliometry. Terminal amino group concentration was 0.16 mmol/g. Terminal carboxyl group concentration was 0.13 mmol/g.

A concentrate containing 25 wt % 0.61 dL/g IhV poly(hexamethylene adipamide) in polyethylene was prepared by extruding and pelletizing a mixture containing 46.3 wt % polyethylene, 25 wt % 0.61 dL/g IhV poly(hexamethylene adipamide), 11.7 wt % Ethanox 330 antioxidant, and 17.0 wt % $TiO_2$. Blends of the poly(hexamethylene adipamide)/polyethylene concentrate with Polyester B were prepared by the following procedure. The polyester was dried in a ConAir drier for 16 hr at 150° C. The polyamide concentrate was dry blended with the polyester pellets in a concentrations of 3 wt %. The mixtures was extruded and pelletized at 275° C. die temperature using a ¾ in. Brabender extruder fitted with a mixing screw. Extrusion AA was 1.1 ppm in the sample containing the polyamide concentrate as compared to 8.6 ppm for a sample with no polyamide concentrate.

EXAMPLES 26–37

A concentrate of 0.4–0.45 I.V. poly(m-xylylene adipamide) in Polyester D is prepared according to the procedure set forth in Example 23. The amount of polyamide in the concentrate is varied as indicated in Table IX. The concentrate is dry blended with Polyester D in the amount (letdown) indicated in Table 3 to give a polyamide concentration in the final blend of 0.05 to 2.0 wt %.

Bottles are prepared by the following procedure. Polyester D was dry blended with the polyamide concentrate and the pellet-pellet blend is dried in a forced-air drier at 150° C. for 4 to 6 hours. Bottle preforms are injection molded on an injection molding machine fitted with a bottle preform mold. The preforms are reheat blow molded into 2-liter bottles. Relative acetaldehyde is the percentage of bottle headspace acetaldehyde in the sample as compared to a sample containing no polyamide concentrate. Relative acetaldehyde and sidewall haze are listed in Table IX.

TABLE IX

| Ex. | Concentrate Polyamide (wt %) | Letdown (wt %) | Final Polyamide (wt %) | Relative AA (%) | Haze (%) |
|---|---|---|---|---|---|
| 26 | 95 | 0.5 | 0.475 | 20 | 2.5 |
| 27 | 95 | 2.1 | 2.0 | 5 | 5 |
| 28 | 75 | 0.5 | 0.375 | 25 | 2 |
| 29 | 75 | 1.0 | 0.75 | 10 | 3 |
| 30 | 75 | 2.0 | 1.5 | 5 | 4 |
| 31 | 50 | 1.0 | 0.5 | 15 | 2.5 |
| 32 | 50 | 2.0 | 1.0 | 10 | 3 |
| 33 | 25 | 4.0 | 1.0 | 10 | 3 |
| 34 | 10 | 0.5 | 0.05 | 85 | 2 |
| 35 | 10 | 1.0 | 0.1 | 70 | 2 |
| 36 | 10 | 5.0 | 0.5 | 15 | 2.5 |
| 37 | 10 | 10.0 | 1.0 | 10 | 3 |

The results in Table IX clearly show that the low molecular weight polyamides of the present invention when incorporated using the polyester/polyamide concentrate are effective in decreasing acetaldehyde concentrations in blow molded bottles without producing visible haze. Table IX also shows that a broad range of concentrate compositions may be used to arrive at the critical range of 0.05 to 2 weight percent polyamide in the final polyester/polyamide blend.

EXAMPLES 38–45

A concentrate of 0.4–0.45 I.V. poly(m-xylylene adipamide) in Polyester E is prepared according to the procedure set forth in Example 23. The amount of polyamide in the concentrate is varied as indicated in Table X. The concentrate is dry blended with Polyester D in the amount (letdown) indicated in Table X to give a polyamide concentration in the final blend of 0.05 to 2.0 wt %.

Bottles are prepared by the following procedure. Polyester D is dried in a forced-air drier at 150° C. for 4 to 6 hours. The concentrate is dried separately at 60° C. for 12 hours. The concentrate is either pellet-pellet blended with Polyester D after drying or is added directly at the injection molding machine using a metering additive feeder. Bottle preforms are injection molded on an injection molding machine fitted with a bottle preform mold. The preforms are reheat blow molded into 2-liter bottles. Relative acetaldehyde is the percentage of bottle headspace acetaldehyde in the sample as compared to a sample containing no polyamide concentrate. Relative acetaldehyde and sidewall haze are listed in Table X.

TABLE X

| Ex. | Polyamide in Concentrate (wt %) | Letdown (wt %) | Final Polyamide Content (wt %) | Relative AA (%) | Haze (%) |
|---|---|---|---|---|---|
| 38 | 95 | 0.5 | 0.475 | 20 | 2.5 |
| 39 | 75 | 1.0 | 0.75 | 10 | 3 |
| 40 | 50 | 2.0 | 1.0 | 10 | 3 |
| 41 | 50 | 4.0 | 2.0 | 5 | 5 |
| 42 | 25 | 2.0 | 0.5 | 15 | 2.5 |
| 43 | 25 | 4.0 | 1.0 | 10 | 3 |
| 44 | 10 | 0.5 | 0.05 | 85 | 2 |
| 45 | 10 | 10.0 | 1.0 | 10 | 3 |

The results in Table X clearly show that the polyamide concentrate can be prepared in a copolyester base and these copolyester/polyamide concentrates can be used to decrease acetaldehyde concentrations in blow molded bottles without producing visible haze. Table X also shows that a broad range of copolyester/polyamide concentrate compositions may be used to arrive at the critical range of 0.05 to 2 weight percent polyamide in the final polyester/polyamide blend.

Many variations will suggest themselves to those skilled in this art in light of the above detailed description. All such obvious modifications are within the full intended scope of the appended claims.

What is claimed is:

1. A polyamide concentrate which is useful for producing a polymer blend having improved flavor retaining property comprising:
    (A) 1 to 90 weight percent of a polymer selected from the group consisting of polycarbonates, polyesters polyolefins, and combinations thereof; and
    (B) 10 to 99 weight percent of a polyamide selected from the group consisting of low molecular weight partially aromatic polyamides having a number average molecular weight of less than 15,000, low molecular weight aliphatic polyamides having a number average molecular weight of less than 7,000, and combinations thereof, wherein the combined weights of (A) and (B) total 100 percent.

2. A polyamide concentrate which is useful for producing a polymer blend having improved flavor retaining property comprising:
    (A) 1 to 90 weight percent of a polyester which comprises
        (1) a dicarboxylic acid component comprising repeat units from at least 60 mole percent terephthalic acid; and
        (2) a diol component comprising repeat units from at least 50 mole percent ethylene glycol, based on 100 mole percent dicarboxylic acid and 100 mole percent diol; and
    (B) 10 to 99 weight percent of a polyamide selected from the group consisting of low molecular weight partially aromatic polyamides having a number average molecular weight of less than 15,000, low molecular weight aliphatic polyamides having a number average molecular weight of less than 7,000, and combinations thereof, wherein the combined weights of (A) and (B) total 100 percent.

3. A polyamide concentrate which is useful for producing a polymer blend having improved flavor retaining property comprising:
    (A) 1 to 90 weight percent of a polyester which comprises
        (1) a dicarboxylic acid component comprising repeat units from at least 85 mole percent terephthalic acid; and
        (2) a diol component comprising repeat units from at least 85 mole percent ethylene glycol, based on 100 mole percent dicarboxylic acid and 100 mole percent diol; and
    (B) 10 to 99 weight percent of a polyamide selected from the group consisting of low molecular weight partially aromatic polyamides having a number average molecular weight of less than 15,000, low molecular weight aliphatic polyamides having a number average molecular weight of less than 7,000, and combinations thereof, wherein the combined weights of (A) and (B) total 100 percent.

4. The composition according to claim 2 wherein the dicarboxylic acid component consists essentially of repeat units from terephthalic acid, and the diol component consists essentially of repeat units from ethylene glycol.

5. The composition according to claim 1 wherein said low molecular weight partially aromatic polyamide is selected from the group consisting of poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide).

6. The composition according to claim 5 wherein said low molecular weight partially aromatic polyamide is poly(m-xylylene adipamide).

7. The composition according to claim 1 wherein said low molecular weight aliphatic polyamide is selected from the group consisting of poly(hexamethylene adipamide) and poly(caprolactam).

8. The composition according to claim 7 wherein said low molecular weight aliphatic polyamide is poly(hexamethylene adipamide).

9. The composition according to claim 1 wherein said low molecular weight partially aromatic polyamide is selected from the group consisting of poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide).

10. The composition according to claim 9 wherein said low molecular weight partially aromatic polyamide is poly(m-xylylene adipamide).

11. The composition according to claim 1 which additionally contains an additive selected from the group consisting of crystallization aids, impact modifiers, surface lubricants, denesting agents, stabilizers, antioxidants, ultraviolet light absorbing agents, metal deactivators, colorants, nucleating agents, phosphate stabilizers, processing aids and fillers.

12. The composition according to claim 11 wherein the nucleating agent is polyethylene.

13. The composition according to claim 11 wherein the colorant is titanium dioxide.

14. The composition according to claim 11 wherein the colorant is copper phthalocyanine blue.

15. The composition according to claim 1 wherein the polyolefin, component (A) is polyethylene.

16. The composition according to claim 1 wherein the polyolefin, component (A) is polypropylene.

17. The composition according to claim 1 wherein the polycarbonate, component (A) is bisphenol A polycarbonate.

* * * * *